(12) United States Patent
Umakoshi et al.

(10) Patent No.: US 10,471,929 B2
(45) Date of Patent: Nov. 12, 2019

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Tomonari Umakoshi, Aichi-ken (JP); Takuhiro Saito, Aichi-ken (JP); Yuya Nagata, Aichi-ken (JP); Takahiro Osaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 247 days.

(21) Appl. No.: 15/641,790

(22) Filed: Jul. 5, 2017

(65) Prior Publication Data
US 2018/0009410 A1 Jan. 11, 2018

(30) Foreign Application Priority Data
Jul. 7, 2016 (JP) .................. 2016-135240

(51) Int. Cl.
*B60R 22/34* (2006.01)
*B60R 22/40* (2006.01)
*B60R 22/46* (2006.01)

(52) U.S. Cl.
CPC ............. *B60R 22/34* (2013.01); *B60R 22/40* (2013.01); *B60R 22/46* (2013.01); *B60R 2022/4666* (2013.01)

(58) Field of Classification Search
CPC ......... B60R 22/34; B60R 22/40; B60R 22/46; B60R 2022/3402
See application file for complete search history.

(56) References Cited

U.S. PATENT DOCUMENTS

2006/0231664 A1  10/2006  Takao et al.
2011/0006147 A1*  1/2011  Umakoshi ............. B60R 22/343
                                                    242/374
(Continued)

FOREIGN PATENT DOCUMENTS

CN      1847061 A     10/2006
CN    203481984 U      3/2014
(Continued)

OTHER PUBLICATIONS

Office Action issued in the corresponding Japanese Application No. 2016-135240 dated Jun. 20, 2017.

*Primary Examiner* — Sang K Kim
(74) *Attorney, Agent, or Firm* — Roberts Mlotkowski Safran Cole & Calderon P.C.

(57) ABSTRACT

A webbing take-up device includes a spool on which a webbing worn by an occupant is taken up, and a motor that includes a rotation shaft and a first boss portion disposed coaxially with the rotation shaft. The webbing take-up device further includes an A-gear that is fixed to the rotation shaft, and a B-gear that meshes together with the A-gear and that is rotated by the A-gear being rotated such that the spool is rotated. The webbing take-up device further includes a gear housing that includes a B-gear support portion on which the B-gear is supported, and an engaged hole engaged by the first boss portion so as to have tightening margin therebetween, and to which the motor is fixed in a state in which the first boss portion has engaged with the engaged hole.

3 Claims, 14 Drawing Sheets

(56) References Cited

U.S. PATENT DOCUMENTS

| | | | |
|---|---|---|---|
| 2011/0101145 A1* | 5/2011 | Maemura | B60R 22/4628 |
| | | | 242/390.8 |
| 2015/0251629 A1* | 9/2015 | Tatsuma | B60R 22/46 |
| | | | 242/390.8 |

FOREIGN PATENT DOCUMENTS

| | | |
|---|---|---|
| JP | S59-185420 U | 12/1984 |
| JP | H04-193045 A | 7/1992 |
| JP | 2000-156952 A | 6/2000 |
| JP | 2006-132606 A | 5/2006 |
| JP | 2007-099257 A | 4/2007 |
| JP | 2014-004853 A | 1/2014 |

* cited by examiner

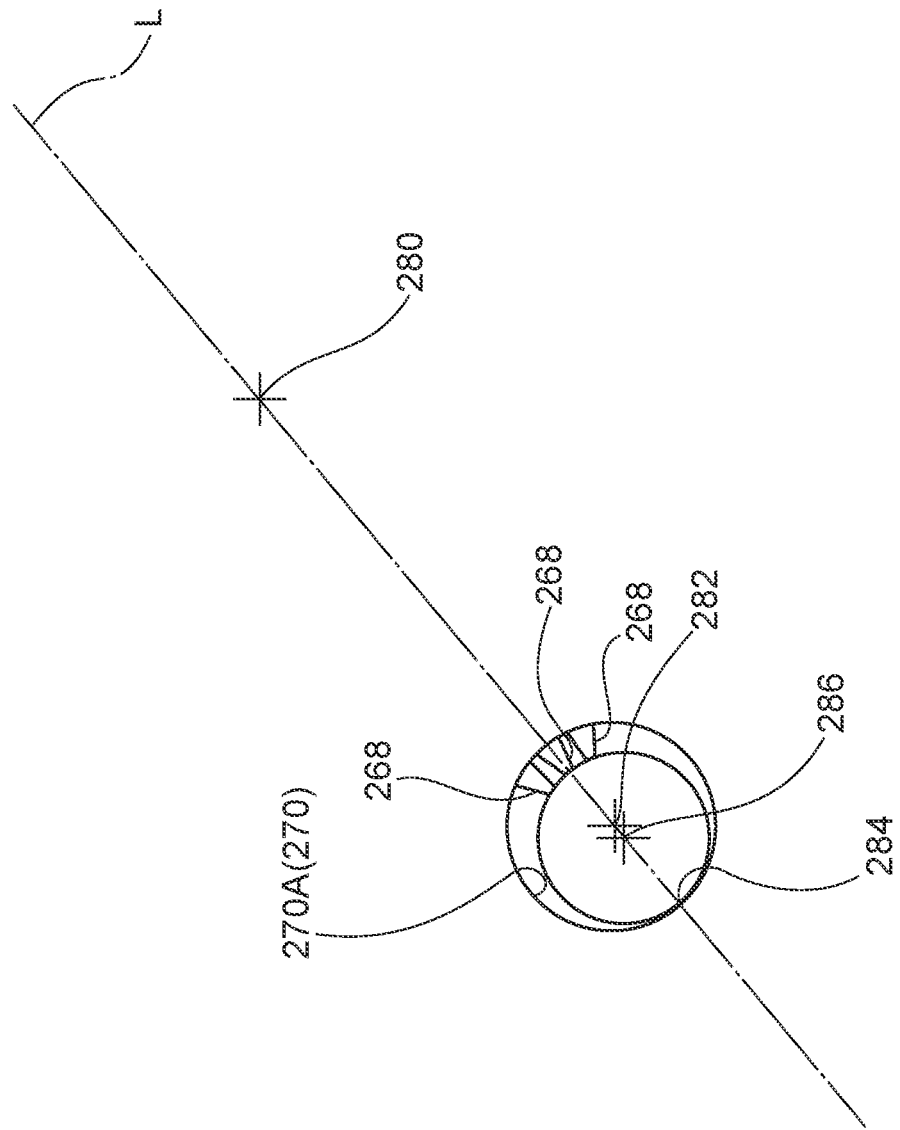

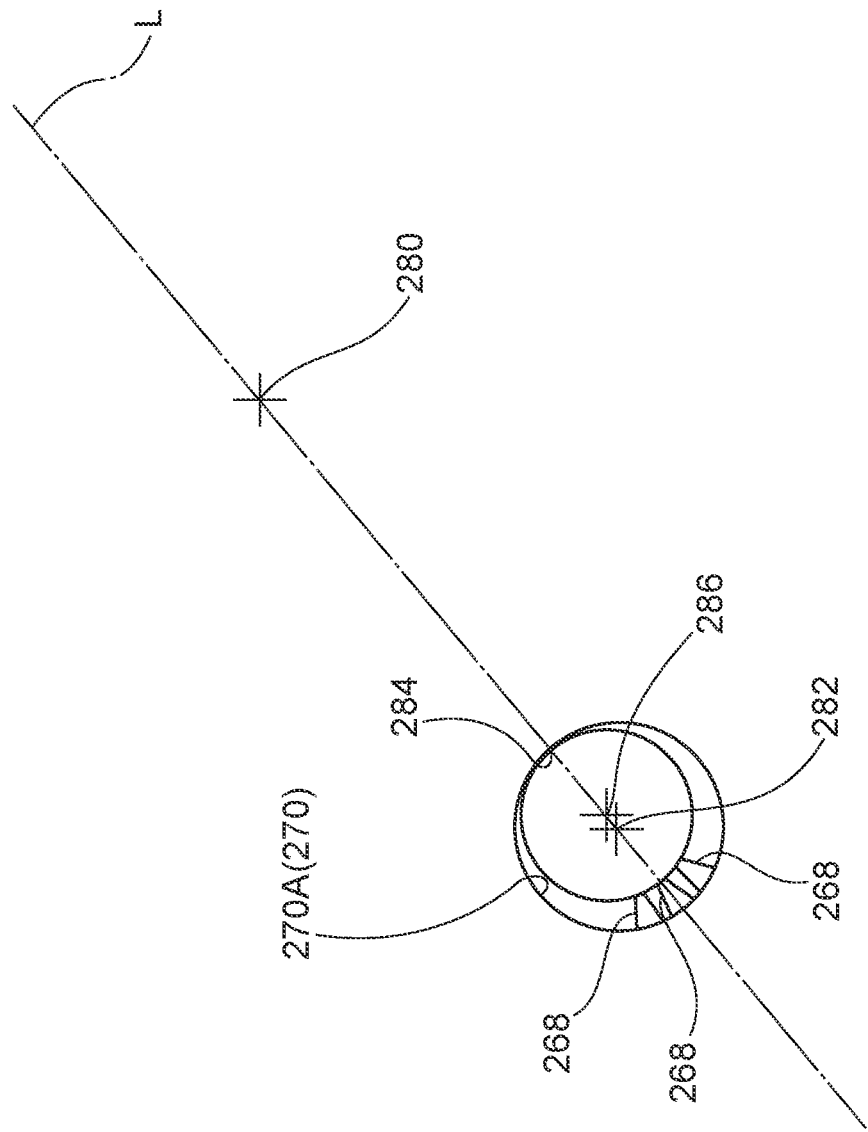

WEBBING TAKE-UP DEVICE

CROSS-REFERENCE TO RELATED APPLICATION

This application claims priority under 35 USC 119 from Japanese Patent Application No. 2016-135240 filed Jul. 7, 2016, the disclosure of which is incorporated by reference herein.

BACKGROUND

Field of the Invention

The present invention relates to a webbing take-up device.

Related Art

Japanese Patent Application Laid-Open (JP-A) No. 2007-99257 describes a webbing take-up device capable of taking up a webbing onto a spool by rotating the spool in a take-up direction by drive force of a motor.

In webbing take-up devices that rotate a spool by drive force of a motor, it is desirable to reduce operation noise when rotating the spool by the drive force of the motor.

SUMMARY

In consideration of the above circumstances, a webbing take-up device is obtained that is capable of reducing operation noise when rotating a spool by drive force of a motor.

A webbing take-up device of a first aspect includes: a spool on which a webbing worn by an occupant is taken up; a motor that includes a rotation shaft and an engaging portion disposed coaxially with the rotation shaft; a first gear that is fixed to the rotation shaft; a second gear that meshes with the first gear and that is rotated due to the first gear being rotated such that the spool is rotated; and a housing that includes a second gear support portion on which the second gear is supported, and an engaged portion that is engaged with the engaging portion such that a tightening margin exists between the engaged portion and the engaging portion, the motor being fixed to the housing in a state in which the engaging portion is engaged with the engaged portion.

A webbing take-up device of a second aspect is the webbing take-up device of the first aspect, wherein: the engaged portion is an engaged hole, a projection being provided at an inner peripheral portion of the engaged hole; and the projection is deformed in a state in which the engaging portion is disposed inside the engaged hole.

A webbing take-up device of a third aspect is the webbing take-up device of the second aspect, wherein the engaging portion abuts a portion of an inner peripheral face of the engaged hole, the projection not being formed at the portion of the inner peripheral face.

According to the webbing take-up device of the first aspect, the webbing that is worn by an occupant is taken up onto the spool. When the rotation shaft of the motor rotates, the first gear fixed to the rotation shaft is rotated. Moreover, when the first gear is rotated, the second gear that meshes with the first gear is rotated, and the spool is rotated. This thereby enables the webbing to be taken up onto the spool.

The second gear is supported on the second gear support portion of the housing. The motor, to the rotation shaft of which the first gear is fixed, is fixed to the housing. Note that in the first aspect, the engaging portion disposed coaxially with the rotation shaft of the motor is engaged with the engaged portion of the housing so as to have tightening margin therebetween. Accordingly, by making such a configuration in which the engaging portion of the motor is engaged with the engaged portion of the housing such that tightening margin exists therebetween, variation in a separation between the rotation shaft of the first gear (the rotation shaft of the motor) and a rotation shaft of the second gear can be suppressed. The first gear and the second gear accordingly mesh stably, enabling a reduction in operation noise when the spool is being rotated under drive force from the motor.

According to the webbing take-up device of the second aspect, the projection provided to the inner peripheral portion of the engaged hole is deformed when the engaging portion of the motor is inserted into the engaged hole of the housing. Due to the projection provided to the inner peripheral portion of the engaged hole being deformed when the engaging portion of the motor is inserted into the engaged hole of the housing in this manner in the second aspect, the engaging portion of the motor can easily be engaged with the engaged hole of the housing in a state in which tightening margin exists therebetween.

According to the webbing take-up device of the third aspect, in a state in which the engaging portion of the motor has been inserted into the engaged hole of the housing, the engaging portion of the motor abuts the portion of the inner peripheral face of the engaged hole of the housing where the projection is not formed. Accordingly, by making such a configuration in which the engaging portion of the motor is abutted against a portion of the inner peripheral face of the engaged hole of the housing that does not deform, variation in the separation between the rotation shaft of the first gear (rotation shaft of the motor) and the rotation shaft of the second gear can be even further suppressed.

On the other hand, it is possible in the second aspect that the engaging portion abuts only a deformed portion of the projection.

BRIEF DESCRIPTION OF THE DRAWINGS

Exemplary embodiments will be described in detail with reference to the following figures, wherein:

FIG. 7A is a side view illustrating a normal state of a clutch spring, and FIG. 7B is a side view illustrating a state in which an external diameter dimension of a coil portion of the clutch spring has been enlarged;

FIG. 13 is a plan view schematically illustrating an engaged hole and the vicinity thereof in a modified example; and FIG. 14 is a plan view corresponding to FIG. 13, schematically illustrating an engaged hole and the vicinity thereof in another modified example.

DETAILED DESCRIPTION

Explanation follows regarding a webbing take-up device of an exemplary embodiment, with reference to FIG. 1 to FIG. 9.

Figure 1:
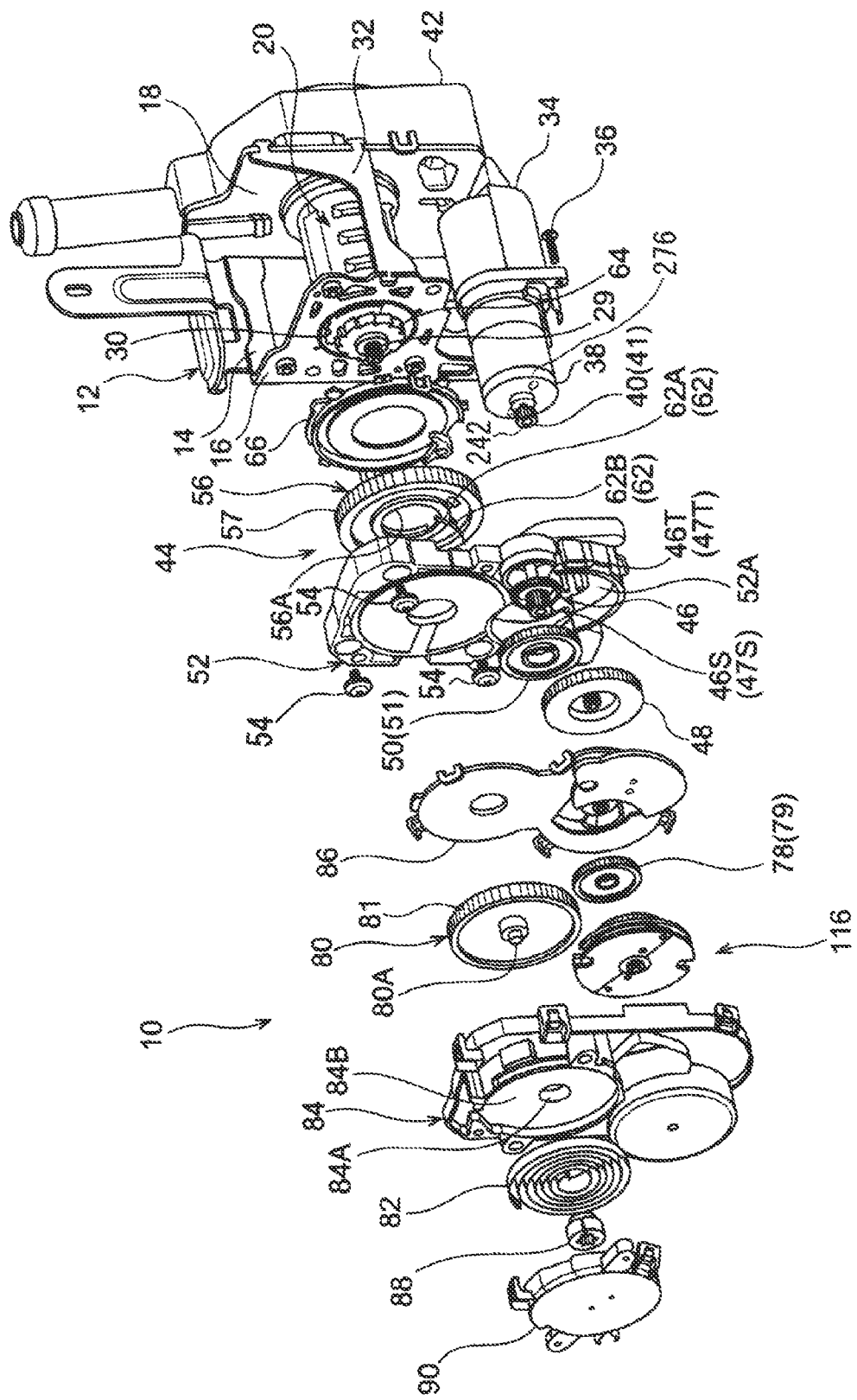
FIG. 1 is an exploded perspective view illustrating a webbing take-up device according to an exemplary embodiment.

FIG. 1 is an exploded perspective view illustrating a webbing take-up device 10 according to an exemplary embodiment of the present invention. As illustrated in FIG. 1, the webbing take-up device 10 includes a frame 12. The frame 12 includes a substantially plate-shaped back plate 14. The back plate 14 is fixed to a vehicle body by a fastening member such as a bolt, not shown in the drawings, thereby fixing the webbing take-up device 10 to the vehicle body. A pair of parallel leg pieces 16, 18 extend from both width direction ends of the back plate 14, and a spool 20, manufactured by die-casting or the like, is rotatably disposed between the leg pieces 16, 18. Note that a connection piece 32 spans between the leg piece 16 and the leg piece 18.

The spool 20 is formed in a substantially circular cylinder (tube) shape. A base end portion of webbing formed in an elongated strap shape, not shown in the drawings, is fixed to the spool 20. Rotating the spool 20 toward one direction about its axis (in a direction referred to below as the "take-up direction") takes up the webbing onto an outer peripheral portion of the spool 20 in a layered shape starting from a base end side of the webbing. Pulling the webbing from its leading end side pulls out the webbing that has been taken up onto the outer peripheral portion of the spool 20, accompanying which the spool 20 rotates in the opposite direction to the rotation direction when taking up the webbing (the rotation direction of the spool 20 when pulling out the webbing is referred to below as the "pull-out direction").

A support shaft portion 29 stands out from an axial center portion at an end portion on the leg piece 16 side of the spool 20. The support shaft portion 29 passes through a circular hole 30 formed in the leg piece 16 substantially coaxially, and projects out to the outside of the frame 12. A ratchet 64, described later, is fixed to the support shaft portion 29 at a projection direction base end side of the support shaft portion 29. The ratchet 64 is thus capable of rotating together with the spool 20.

Moreover, a motor 38 is fixed to a gear housing 52, serving as a housing, described later. The motor 38 is disposed below the spool 20, between the pair of leg pieces 16, 18 of the frame 12. Note that a motor housing 240 (see FIG. 8) of the motor 38 is covered by a motor cover 34, and the motor cover 34 is fixed to the gear housing 52 using a screw 36.

Moreover, an A gear 40, serving as a first gear formed with plural outer teeth 41 at an outer peripheral portion of the A gear 40, is fixed to a rotation shaft 242 of the motor 38.

A support shaft portion, not shown in the drawings, stands out from an end portion on the leg piece 18 side of the spool 20. The support shaft portion passes substantially coaxially through a ratchet hole, not shown in the drawings, formed in the leg piece 18 and projects out to the outside of the frame 12. A lock base, on which a lock plate configuring part of a lock mechanism is supported, is fixed to the support shaft portion. In a vehicle emergency (for example, during sudden deceleration of the vehicle), the lock plate projects out from the lock base, and meshes together with an inner peripheral portion of the ratchet hole formed in the leg piece 18, preventing rotation of the spool 20 in the pull-out direction. A cover 42 that covers the lock mechanism and the like is fixed to the leg piece 18.

The gear housing 52, in which a first clutch 44, a B-gear 46, an OL-gear 48, and a C-gear 50 are housed, is fixed to the leg piece 16 by a screw 54.

Figure 2:
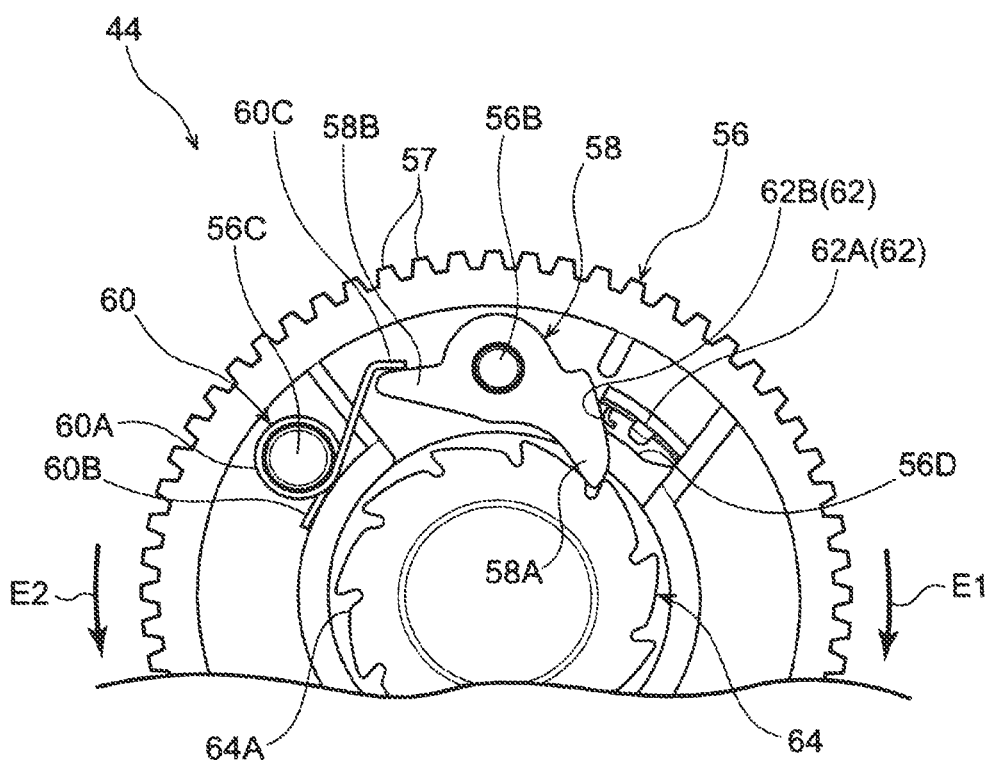
FIG. 2 is a side view of a first clutch as viewed from the side of a leg piece of a frame, illustrating a state in which a lock bar is engaged with a ratchet.

As illustrated in FIG. 2, the first clutch 44 is configured including a clutch gear 56 formed in a ring shape, a lock bar 58 and return spring 60 that are attached to the clutch gear 56, a friction spring 62, and the ratchet 64 that is fixed to the spool 20.

Specifically, plural outer teeth 57 are formed to an outer peripheral portion of the clutch gear 56, and, as illustrated in FIG. 1, a circular insertion hole 56A, through which the support shaft portion 29 of the spool 20 is inserted, is formed at an inner peripheral portion of the clutch gear 56. Moreover, a lock bar support shaft 56B and a return spring support shaft 56C that project out toward the leg piece 16 side and that are disposed at a separation to each other in the peripheral direction of the clutch gear 56 stand out from a radial direction intermediate portion of the clutch gear 56. A friction spring insertion hole 56D, through which part of the friction spring 62 is inserted, is formed at a peripheral direction intermediate portion of the clutch gear 56. As illustrated in FIG. 1, the clutch gear 56 described above is housed inside a housing recess formed on the leg piece 16 side of the gear housing 52. A first seat 66 is attached to the gear housing 52, thereby restricting movement of the clutch gear 56 toward the leg piece 16 side.

As illustrated in FIG. 2, the lock bar 58 is formed in a substantially half-moon shape as viewed along the axial direction of the clutch gear 56, and the lock bar 58 is capable of tilting due to being supported by the lock bar support shaft 56B provided to the clutch gear 56. One end portion of the lock bar 58 configures a ratchet engaging portion 58A that engages with the ratchet 64, and another end portion of the lock bar 58 configures a return spring abutting portion 58B that the return spring 60 abuts.

The return spring 60 includes a coil portion 60A that is coiled into a ring shape and that is supported by the return spring support shaft 56C provided to the clutch gear 56. One end portion of the return spring 60 configures a catch portion 60B that extends out from the coil portion 60A and is caught on part of the clutch gear 56. Another end portion of the return spring 60 configures an abutting portion 60C that extends out from the coil portion 60A and abuts the return spring abutting portion 58B of the lock bar 58. Urging force of the return spring 60 is input to the return spring abutting portion 58B of the lock bar 58, such that the ratchet engaging portion 58A of the lock bar 58 is kept separate from the ratchet 64.

Figure 3:
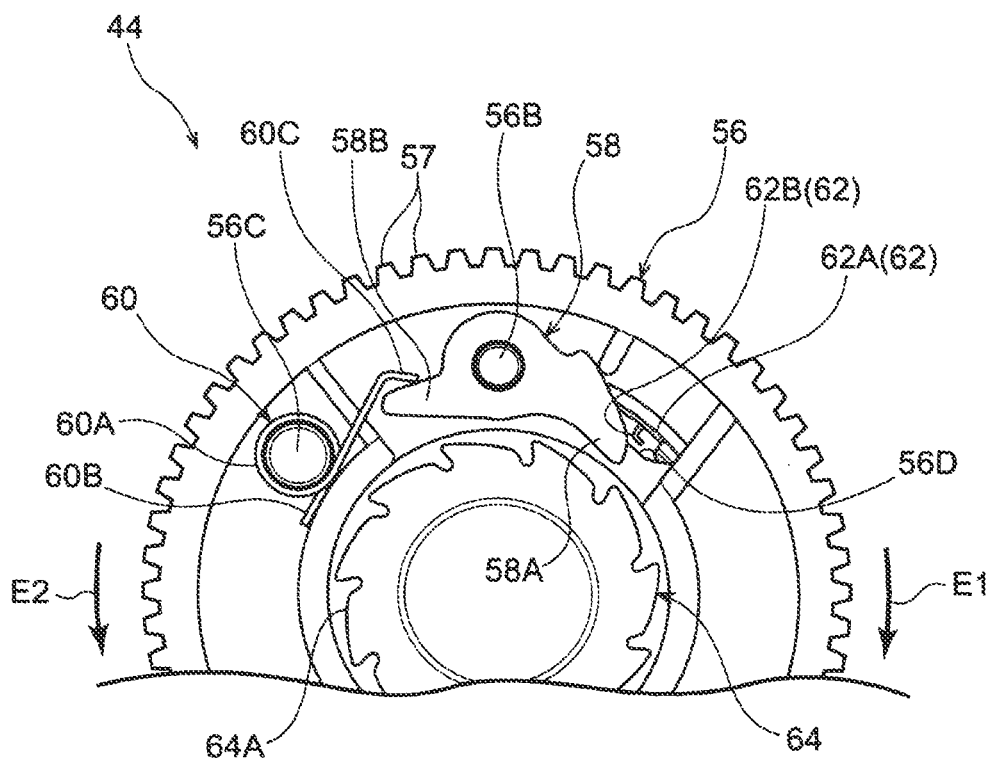
FIG. 3 is a side view corresponding to FIG. 2 of the first clutch as viewed from the side of the leg piece of the frame, illustrating a state in which the lock bar is not engaged with the ratchet.

As illustrated in FIG. 1, the friction spring 62 is provided between the clutch gear 56 and the gear housing 52. The friction spring 62 includes a sliding contact portion 62A that makes sliding contact with the gear housing 52 when the clutch gear 56 is rotated, and a pressing portion 62B that extends out from the sliding contact portion 62A toward the clutch gear 56 side, and is inserted through the friction spring insertion hole 56D (see FIG. 2) formed in the clutch gear 56. As illustrated in FIG. 2, when the clutch gear 56 is rotated toward one axial direction side (the arrow E1 direction side), the pressing portion 62B of the friction spring 62 presses the ratchet engaging portion 58A of the lock bar 58. Moreover, when force input to the ratchet engaging portion 58A of the lock bar 58 from the pressing portion 62B of the friction spring 62 exceeds the urging force of the return spring 60, the lock bar 58 is tilted, and the ratchet engaging portion 58A of the lock bar 58 engages with the ratchet 64. Rotation force input to the clutch gear 56 is thereby input to the ratchet 64 through the lock bar 58, and the spool 20 is rotated in the take-up direction together with the ratchet 64. In contrast thereto, as illustrated in FIG. 3, when the clutch gear 56 is rotated toward another axial direction side (the arrow E2 direction side), force input to the ratchet engaging portion 58A of the lock bar 58 from the pressing portion 62B of the friction spring 62 does not exceed the urging force of the return spring 60, and so the ratchet engaging portion 58A of the lock bar 58 does not engage with the ratchet 64. Accordingly, the rotation force input to the clutch gear 56 is not input to the ratchet 64 through the lock bar 58.

The ratchet 64 is formed in a circular disk shape. Plural engaged outer teeth 64A that engage with the ratchet engaging portion 58A of the lock bar 58 are formed to an outer peripheral portion of the ratchet 64. As illustrated in FIG. 1, the ratchet 64 is fixed to the support shaft portion 29 of the spool 20 by press-fitting or the like.

The B-gear 46, serving as a second gear, includes a large diameter portion 46T formed at an outer peripheral portion with plural outer teeth 47T that mesh together with the outer teeth 41 of the A-gear 40, and a small diameter portion 46S disposed coaxially to the large diameter portion 46T and integrally formed to the large diameter portion 46T. An external diameter of the small diameter portion 46S is set smaller than an external diameter of the large diameter portion 46T, and an outer peripheral portion of the small diameter portion 46S is formed with plural outer teeth 47S that mesh together with the OL-gear 48, described below.

The OL-gear 48 is configured including an input gear that meshes together with the B-gear 46, and an output gear that is rotated by rotation force transmitted from the input gear, and that meshes together with the C-gear 50. Note that a limiter mechanism, not illustrated in the drawings, is provided between the input gear and the output gear in order to suppress tension in the webbing from reaching a predetermined value or greater during pre-tensioning, described later.

As illustrated in FIG. 1, the C-gear 50 is formed in a circular disk shape that is formed with plural outer teeth 51 that mesh together with outer teeth of the output gear configuring part of the OL-gear 48, and with the outer teeth 57 of the clutch gear 56 configuring part of the first clutch 44. The C-gear 50 rotates the clutch gear 56 due to the C-gear 50 being rotated by the output gear of the OL-gear 48.

The B-gear 46, the OL-gear 48, and the C-gear 50 described above are rotatably supported on respective shaft portions provided inside a housing recess 52A, in a state housed inside the housing recess 52A formed in the gear housing 52.

A spring holder 84, on which an idle gear 78, a spool gear 80, a retractor spring 82, and a second clutch 116 are supported, is fixed to the gear housing 52.

The idle gear 78 is formed in a circular disk shape. Plural outer teeth 79 that mesh together with the spool gear 80 and the second clutch 116, described later, are formed at an outer peripheral portion of the idle gear 78. In a state housed inside a housing recess formed to a location on the gear housing 52 side of the spring holder 84, the idle gear 78 is rotatably supported on a shaft portion standing out inside the housing recess. A second seat 86 is attached to the spring holder 84, thereby restricting movement of the idle gear 78 toward the gear housing 52 side.

The spool gear 80 is formed in a circular disk shape set with a larger diameter than the idle gear 78. Plural outer teeth 81 that mesh together with the outer teeth 79 of the idle gear 78 are formed at an outer peripheral portion of the spool gear 80. An adaptor fixing portion 80A is formed projecting out toward the retractor spring 82 side at an axial center portion of the spool gear 80. An engagement hole, not shown in the drawings, with which the support shaft portion 29 of the spool 20 engages, is formed at a location on the spool 20 side of the axial center portion of the spool gear 80. The engagement hole of the spool gear 80 is engaged with the support shaft portion 29 of the spool 20, thereby coupling the spool gear 80 and the spool 20 so as to be capable of rotating together integrally (as a unit). The spool gear 80 is housed inside a housing recess formed at a location on the gear housing 52 side of the spring holder 84. In a housed state of the spool gear 80 inside the housing recess, the adaptor fixing portion 80A of the spool gear 80 projects out toward the retractor spring 82 side through an insertion hole 84A formed in a bottom wall of the housing recess.

The retractor spring 82 is formed in a spiral shape, and the retractor spring 82 is housed inside a spring housing portion 84B formed to the spring holder 84 on the opposite side to the side where the spool gear 80 is housed. An inner end portion of the retractor spring 82 is caught to an adaptor 88 that is fixed to the adaptor fixing portion 80A of the spool gear 80. An outer end portion of the retractor spring 82 is anchored to an anchor portion, not shown in the drawings, formed inside the spring housing portion 84B. Urging force of the retractor spring 82 is transmitted to the spool 20 through the adaptor 88 and the spool gear 80, such that the spool 20 is urged so as to rotate toward the take-up direction. Note that (a take-up force in the webbing resulting from) the urging force of the retractor spring 82 is set so as to be comparatively weak, at a level that eliminates slack in the webbing when worn by an occupant. In other words, the urging force of the retractor spring 82 is set at a strength that does not constrict the occupant in a state wearing the webbing and that does not require enough strength to completely take up the webbing pulled out from the spool 20 against frictional force and the like acting on the webbing.

A spring cover 90 is attached to the spring holder 84. The retractor spring 82 housed inside the spring housing portion 84B is thereby covered by the spring cover 90.

Figure 4:
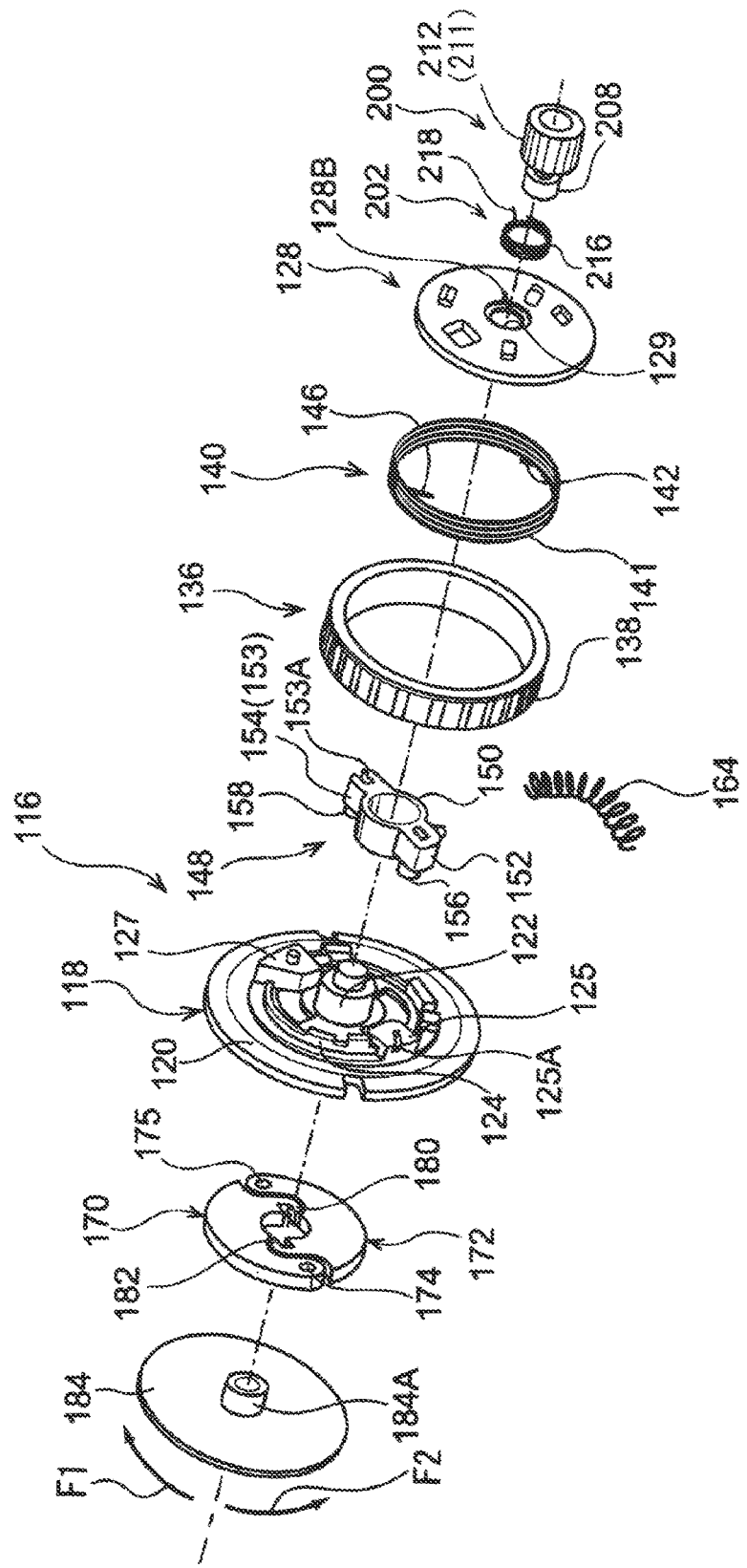
FIG. 4 is an exploded perspective view illustrating a second clutch.
Figure 5:
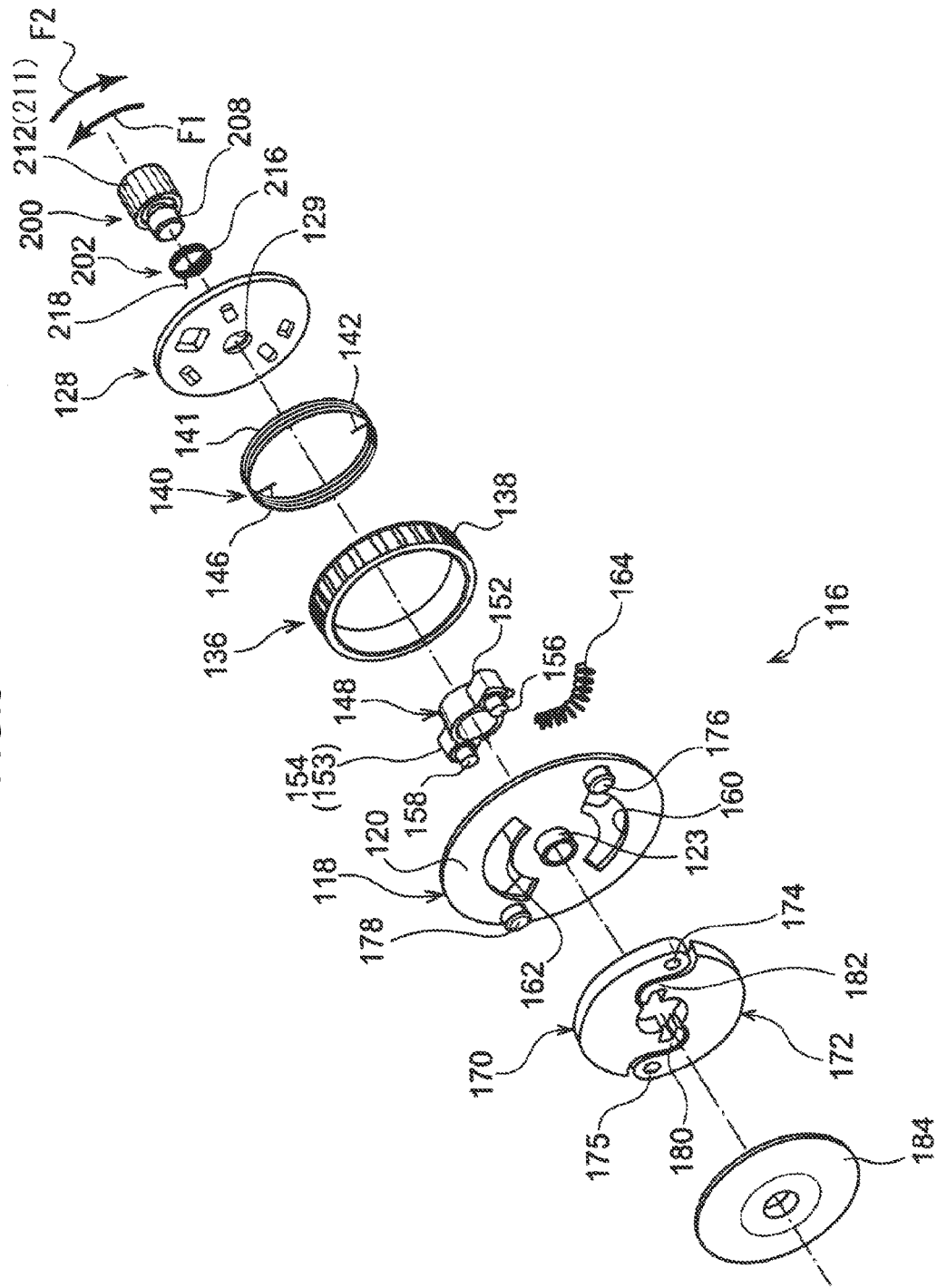
FIG. 5 is an exploded perspective view illustrating a second clutch as viewed from the opposite side to FIG. 4.
Figure 6:
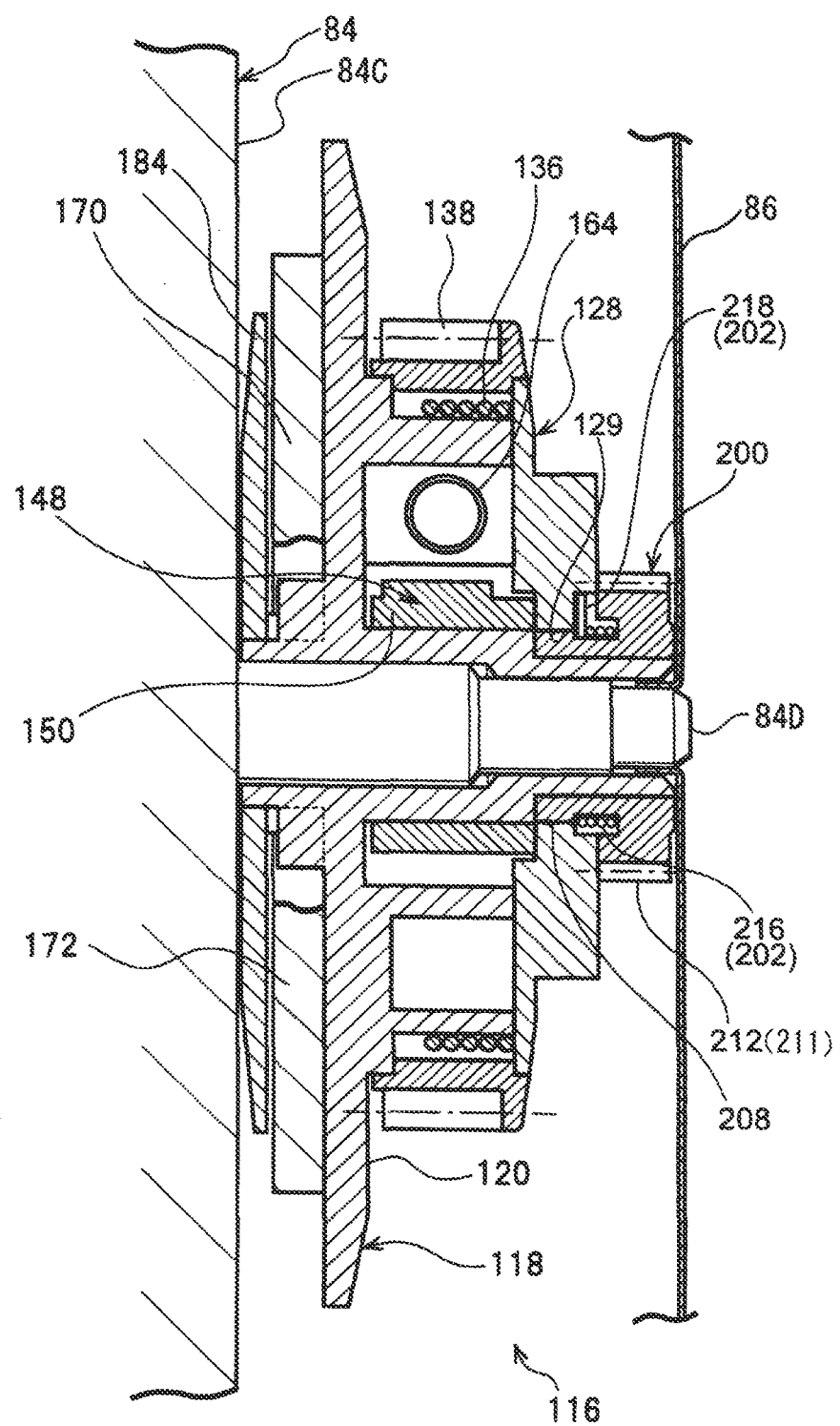
FIG. 6 is a cross-section taken along an axial direction of a second clutch.

FIG. 4 and FIG. 5 are exploded perspective views illustrating configuration of the second clutch 116. FIG. 6 illustrates configuration of the second clutch 116 in cross-section. As illustrated in FIG. 4 to FIG. 6, the second clutch 116 includes a base 118 and a rotor plate 128 that is attached to the base 118 so as to rotate as a unit together with the base 118. The second clutch 116 also includes a clutch gear 136, a clutch spring 140 provided between the base 118 and the clutch gear 136, and a lever 148 rotatably supported by the base 118. The second clutch 116 also includes a pair of clutch weights 170, 172 supported by the base 118, and a spacer 184 attached to the base 118.

The base 118 includes a circular disk portion 120 formed in a circular disk shape, a circular column shaped support shaft portion 122 projecting toward one axial direction side of the circular disk portion 120 at an axial center portion of the circular disk portion 120, and a side wall portion 124 with a substantially C-shaped cross-section formed coaxially around the support shaft portion 122. The base 118 also includes a block shaped first spring catch portion 125 that is formed with a first spring catch groove 125A to which an end portion of one side of the clutch spring 140 is caught, and that projects out in the same direction as the projection direction of the support shaft portion 122. A radial direction outside face of the first spring catch portion 125 is formed with a circular cylinder face shape with the same radius of curvature as an outer peripheral face of the side wall portion 124.

Figure 7A:
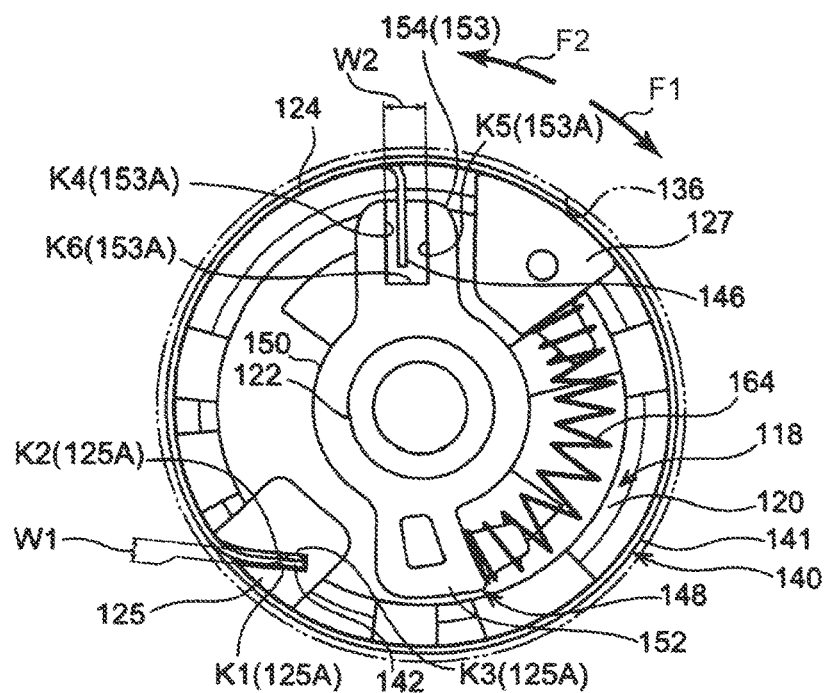
FIG. 7A and FIG. 7B illustrate a partial configuration of a second clutch.

As illustrated in FIG. 7A, the first spring catch groove 125A formed in the first spring catch portion 125 is formed in a groove shape opening at the radial direction outside and on one axial direction side (the rotor plate 128 side) of the base 118. The first spring catch groove 125A is configured including side wall portions K1, K2 disposed parallel to each other with a separation therebetween, and a bottom wall portion K3 forming a terminal face in a depth direction of the first spring catch groove 125A. As viewed along the axial direction of the base 118, the side wall portions K1, K2 are inclined toward the radial direction inside of the base 118 on progression toward another (arrow F1 direction) side about the axis of the base 118. A groove width W1 of the first spring catch groove 125A, namely, a clearance between the side wall portion K1 and the side wall portion K2, is set to a width slightly larger than the wire diameter of a first caught portion 142 of the clutch spring 140, described later. Note that an open end of the first spring catch groove 125A on the one axial direction side of the base 118 is closed off by the rotor plate 128, described later.

As illustrated in FIG. 4 and FIG. 5, the base 118 includes a circular cylinder shaped support shaft portion 123 projecting toward the opposite side of the circular disk portion 120 to the side provided with the support shaft portion 122. At the radial direction outside of the support shaft portion 123, the circular disk portion 120 of the base 118 also includes support shafts 176, 178 projecting out toward the side of the clutch weights 170, 172. The support shafts 176, 178 are disposed at uniform intervals around the peripheral direction of the base 118. A pair of elongated holes 160, 162 are formed around the peripheral direction of the base 118, at locations at the radial direction outside of the support shaft portions 122, 123 on the circular disk portion 120 of the base 118. Coupling projections 156, 158 of the lever 148, described later, engage with the elongated holes 160, 162, and the coupling projections 156, 158 are capable of moving about the peripheral direction of the circular disk portion 120 within the respective elongated holes 160, 162. A catch wall 127 that abuts one end portion of a return spring 164, described later, stands out from the circular disk portion 120.

As illustrated in FIG. 6, the base 118 described above is disposed inside a housing recess 84C formed in the spring holder 84 and is rotatably supported by a shaft portion 84D standing out in the housing recess 84C.

As illustrated in FIG. 4 and FIG. 5, the rotor plate 128 formed in a circular disk shape is provided on one axial direction end side (the right side in FIG. 4 and FIG. 5) of the support shaft portion 122 of the base 118. The rotor plate 128 is engaged with a claw provided to the side wall portion 124 of the base 118 such that the rotor plate 128 is fixed so as to be capable of rotating as a unit together with the base 118. A circular shaft support hole 129 is formed at an axial center portion of the rotor plate 128, and an input gear 200, described later, is rotatably supported by the shaft support hole 129. The rotor plate 128 is rotated, namely the second clutch 116 is rotated, by inputting rotation force of the input gear 200, described later, to the rotor plate 128 through a sub clutch spring 202.

At the base 118 at the radial direction outside of the side wall portion 124, the clutch gear 136 is provided coaxially to, and capable of rotating relative to, the base 118. Plural outer teeth 138 are formed on an outer peripheral portion of the clutch gear 136. The outer teeth 138 mesh together with the outer teeth 79 (see FIG. 1) of the idle gear 78 described above. An internal diameter dimension of the clutch gear 136 is sufficiently larger than an external diameter dimension of the side wall portion 124 of the base 118, and a ring shaped gap is formed between an inner peripheral face of the clutch gear 136 and the outer peripheral face of the side wall portion 124. The clutch spring 140, configured by a torsion coil spring, is disposed coaxially in the ring shaped gap.

The clutch spring 140 includes a coil portion 141 that is coiled into a ring shape between the outer peripheral face of the side wall portion 124 of the base 118 and the inner peripheral face of the clutch gear 136. An end portion on the one side of the clutch spring 140 is bent toward the radial direction inside of the coil portion 141 to configure the first caught portion 142. As illustrated in FIG. 7A, the first caught portion 142 has an incline with respect to the radial direction of the coil portion 141 corresponding to that of the first spring catch groove 125A described above. An end portion on another side of the clutch spring 140 is bent toward the radial direction inside of the coil portion 141 to configure a second caught portion 146. The second caught portion 146 extends along the radial direction of the coil portion 141 corresponding to a second spring catch groove 153A formed in the lever 148, described later. The first caught portion 142 and the second caught portion 146 are disposed at a predetermined separation from each other around the peripheral direction of the coil portion 141. An internal diameter dimension of the coil portion 141 when in a natural state is set as a smaller dimension than an external diameter dimension of the side wall portion 124 of the base 118. The coil portion 141 is accordingly urged in a direction to decrease in diameter under its own elastic force when the coil portion 141 is assembled to the side wall portion 124 of the base 118. The coil portion 141 accordingly makes tight contact with the outer peripheral face of the side wall portion 124 of the base 118 in an assembled state of the coil portion 141 to the side wall portion 124 of the base 118. A clearance is provided between the coil portion 141 and the inner peripheral face of the clutch gear 136 in the assembled state of the coil portion 141 to the side wall portion 124 of the base 118.

The first caught portion 142 of the clutch spring 140 is fitted into and caught by the first spring catch groove 125A formed in the first spring catch portion 125 of the base 118. Moreover, the second caught portion 146 of the clutch spring 140 is fitted into and caught by the second spring catch groove 153A formed in a second spring catch portion 153 of the lever 148, described later.

The lever 148 includes a circular cylinder shaped shaft bearing portion 150. The support shaft portion 122 of the base 118 passes through inside the cylinder of the shaft bearing portion 150, thereby supporting the lever 148 so as to be capable of rotating relative to and about the axis of the support shaft portion 122 (base 118). An outer peripheral portion of the shaft bearing portion 150 is provided with a coupling portion 152 and a coupling portion 154 in a pair projecting out along the radial direction at opposite sides to each other around the peripheral direction (opposite sides at 180° to each other).

As illustrated in FIG. 5, the circular column shaped coupling projection 156 and coupling projection 158 are provided projecting out from the pair of respective coupling portions 152, 154 toward the circular disk portion 120 side of the base 118. The respective coupling projections 156, 158 each engage with engagement pawls 180, 182 provided to the pair of the clutch weight 170 and the clutch weight 172, described later.

Figure 7B:
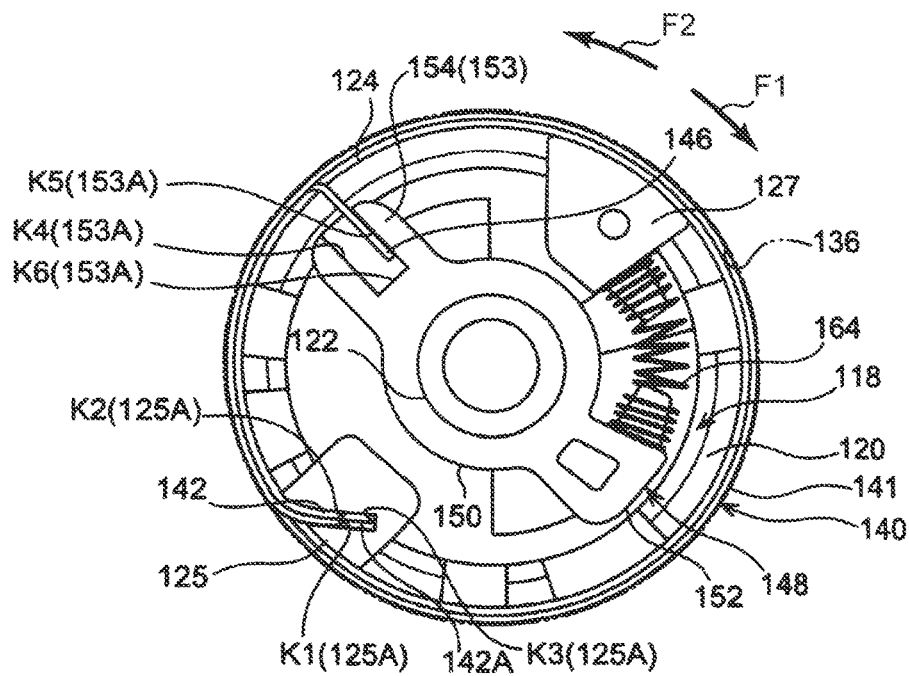

As illustrated in FIG. 7A and FIG. 7B, the one coupling portion 152 of the lever 148 is abutted by one end portion of the return spring 164, this being a torsion coil spring. Another end portion of the return spring 164 abuts the catch wall 127 standing out from the circular disk portion 120 of the base 118. The return spring 164 constantly urges the lever 148 toward one direction about the axis of the base 118 (the arrow F1 direction). The pair of coupling projections 156, 158 of the lever 148 are normally retained in a state abutting one length direction end portion (arrow F1 direction side end portions in FIG. 4 and FIG. 5) of each of the pair of elongated holes 160, 162 of the circular disk portion 120.

As illustrated in FIG. 7A, the other coupling portion 154 of the lever 148 is configured as the second spring catch portion 153 to which the second caught portion 146 of the clutch spring 140 is caught. The second spring catch portion 153 is formed with the second spring catch groove 153A into which the second caught portion 146 of the clutch spring 140 is fitted. Accordingly, as illustrated in FIG. 7A and FIG. 7B, when the lever 148 rotates toward the another direction (the arrow F2 direction) about the axis with respect to the base 118 against the elastic force of the return spring 164, the second caught portion 146 of the clutch spring 140 is moved toward one coil direction of the clutch spring 140 (the arrow F2 direction), enlarging the external diameter dimension of the coil portion 141 of the clutch spring 140. The second spring catch groove 153A is configured including side wall portions K4, K5 and a bottom wall portion K6, in a similar manner to the first spring catch groove 125A described above. In the present exemplary embodiment, in a state in which the lever 148 is supported by the base 118, the side wall portions K4, K5 are substantially parallel to the radial direction of the base 118. A groove width W2 of the second spring catch groove 153A, namely a clearance between the side wall portion K4 and the side wall portion K5, is set as a width sufficiently wider than the wire diameter of the second caught portion 146 of the clutch spring 140. The clutch spring 140 accordingly has good ease of assembly to the base 118 and the lever 148.

Moreover, when the external diameter dimension of the coil portion 141 of the clutch spring 140 is enlarged in this manner, the coil portion 141 of the clutch spring 140 presses against the inner peripheral face of the clutch gear 136. In this state, a predetermined frictional force arises between an outer peripheral portion of the clutch spring 140 and the inner peripheral face of the clutch gear 136, such that the frictional force couples the clutch spring 140 and the clutch gear 136 integrally to one another.

As illustrated in FIG. 4 to FIG. 6, the pair of the clutch weight 170 and the clutch weight 172 that are respectively formed in substantially semicircular plate shapes are disposed on another axial direction side of the base 118 (the opposite side to the rotor plate 128). The pair of clutch weights 170, 172 are set with the same weight as each other, and are provided on opposite sides to each other around the peripheral direction of the circular disk portion 120 (on opposite sides at 180° to each other). Circular shaft bearing holes 174, 175 are formed in one respective peripheral direction sides of the pair of clutch weights 170, 172. The circular column shaped support shaft 176 and the support shaft 178 projecting out from the circular disk portion 120 of the base 118 fit rotatably into the respective shaft bearing holes 174, 175. The respective clutch weights 170, 172 are thereby supported by the base 118 so as to be rotatable (capable of tilting) about the respective support shafts 176, 178 (shaft bearing holes 174, 175) in the radial direction of the base 118.

The one clutch weight 170 includes the substantially U-shaped engagement pawl 180 that engages with the coupling projection 158 of the lever 148 described above. The other clutch weight 172 likewise includes the substantially U-shaped engagement pawl 182 that engages with the coupling projection 156 of the lever 148. The pair of the clutch weight 170 and the clutch weight 172 are thereby synchronized (interlocked) through the lever 148, and are normally retained at the radial direction inside of the base 118 under the urging force of the return spring 164 acting on the lever 148.

As illustrated in FIG. 4 to FIG. 6, the circular disk shaped spacer 184 is disposed on the opposite side of the pair of clutch weights 170, 172 to the base 118. A tube shaped boss portion 184A that fits together with an outer peripheral portion of the support shaft portion 123 of the base 118 stands out from a central portion of the spacer 184. The spacer 184 suppresses the pair of clutch weights 170, 172 from falling off the base 118, and also suppresses the pair of the clutch weight 170 and the clutch weight 172 from interfering on a bottom wall of the housing recess 84C of the spring holder 84.

Note that in the second clutch 116 of the present exemplary embodiment, when the rotor plate 128 rotates toward the one direction (the arrow F1 direction in FIG. 4 and FIG. 5) about its axis, the base 118 that is coupled integrally to the rotor plate 128 rotates toward the one direction about its axis together with the rotor plate 128. Accordingly, the pair of the clutch weight 170 and the clutch weight 172 supported by the base 118 rotate about the axis of the base 118 following the base 118. When this occurs, centrifugal force acts on the pair of the clutch weight 170 and the clutch weight 172, such that rotation torque acts on the clutch weight 170 about the support shaft 176 and rotation torque acts on the clutch weight 172 about the support shaft 178.

Accordingly, when the magnitudes of the rotation torques are at a predetermined value or greater, namely, when the rotation speeds of the pair of clutch weight 170 and the clutch weight 172 are at a predetermined value or greater, the pair of the clutch weight 170 and the clutch weight 172 respectively rotate about the support shaft 176 or the support shaft 178 toward the radial direction outside of the base 118 against the urging force of the return spring 164 acting on the lever 148. Accordingly, configuration is made such that the lever 148, in which the coupling projection 158 is engaged with the engagement pawl 180 of the clutch weight 170, and in which the coupling projection 156 is engaged with the engagement pawl 182 of the clutch weight 172, rotates toward the another direction (the arrow F1 direction in FIG. 7A and FIG. 7B) about the axis with respect to the base 118.

In the present exemplary embodiment, configuration is made such that rotation force of the rotation shaft 242 of the motor 38 is transmitted to the rotor plate 128 through the A-gear 40, the B-gear 46, the OL-gear 48, the input gear 200, and the sub clutch spring 202 serving as a clutch and a clutch spring.

As illustrated in FIG. 6, the input gear 200 is configured including a shaft portion 208 that is rotatably supported by the shaft support hole 129 of the rotor plate 128, and a gear portion 211 that is integrally provided to the shaft portion 208. The shaft portion 208 is formed in a substantially circular cylinder shape, and an end portion on the rotor plate 128 side of the shaft portion 208 engages with the shaft support hole 129 of the rotor plate 128. Moreover, the sub clutch spring 202 engages with an outer peripheral face of a portion of the shaft portion 208 on the opposite side to the rotor plate 128. The sub clutch spring 202, described later, is press-mounted to the shaft portion 208, such that the input gear 200 and the sub clutch spring 202 rotate together as a unit. Moreover, the gear portion 211 is provided at an end portion on one side of the shaft portion 208, and outer teeth 212 of a spur gear are formed to an outer peripheral portion of the gear portion 211. The outer teeth 212 mesh together with the outer teeth of the input gear configuring part of the OL-gear 48, described above.

As illustrated in FIG. 4, the sub clutch spring 202 is provided between the input gear 200 and the rotor plate 128. The sub clutch spring 202 is formed, for example, by bending a wire shaped member. The sub clutch spring 202 includes a coil portion 216 coiled in a ring shape around the outer peripheral face of the shaft portion 208 of the input gear 200. Moreover, an end portion on the rotor plate 128 side of the sub clutch spring 202 is configured with a caught portion 218 that is bent around toward the radial direction outside of the coil portion 216. The coil portion 216 is formed by coiling the wire shaped member in a spiral shape toward another direction side about its axis (in the arrow F1 direction) as viewed from the opposite side to the side on which the caught portion 218 is formed. Moreover, an internal diameter dimension of the coil portion 216 when in a natural state is set to a smaller dimension than, or the same dimension as, an external diameter dimension of the shaft portion 208. Accordingly, the coil portion 216 is configured so as to abut the outer peripheral face of the shaft portion 208 when in an assembled state of the sub clutch spring 202 to the shaft portion 208.

An inner peripheral edge portion of the shaft support hole 129 of the rotor plate 128 is formed with an catch groove 218B to which the caught portion 218 of the sub clutch spring 202 is caught.

Moreover, when the input gear 200 is rotated toward the one (arrow F1 direction) side about its axis, the external diameter of the coil portion 216 attempts to contract as a result of frictional force between the shaft portion 208 of the input gear 200 and the coil portion 216 of the sub clutch spring 202. Accordingly, the coil portion 216 tightly contacts the shaft portion 208, and the input gear 200 is rotated toward the another (arrow F1 direction) side about its axis together with the sub clutch spring 202. As a result, rotation force of the input gear 200 toward the one (arrow F1 direction) side about its axis is transmitted to the rotor plate 128 through the sub clutch spring 202, and the second clutch 116 is rotated toward the one (arrow F1 direction) side about its axis.

Moreover, when the input gear 200 is rotated toward the another (arrow F2 direction) side about its axis, the external diameter of the coil portion 216 attempts to increase as a result of frictional force between the shaft portion 208 of the input gear 200 and the coil portion 216 of the sub clutch spring 202. The shaft portion 208 accordingly spins idly with respect to coil portion 216. As a result, the transmission of rotation force of the input gear 200 toward the another (arrow F2 direction) side about its axis to the rotor plate 128 is blocked, and the second clutch 116 is not rotated toward the another (arrow F2 direction) side about its axis.

Next, explanation follows regarding detailed configuration of the motor 38 and the gear housing 52, these being relevant portions of present exemplary embodiment.

Figure 8:
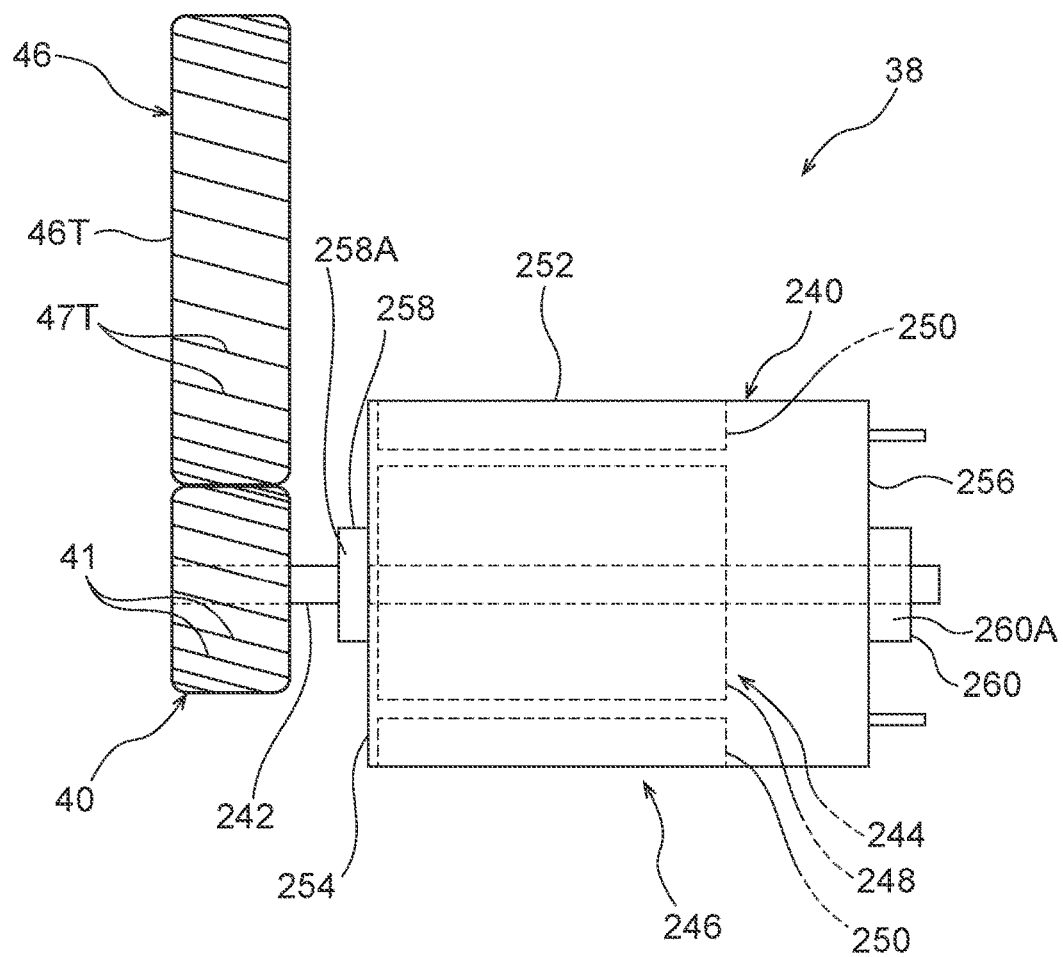
FIG. 8 is a side view schematically illustrating a motor.

As illustrated in FIG. 8, the motor 38 of the present exemplary embodiment is a direct current (DC) motor. The motor 38 includes a rotor 244 and a stator 246. The rotor 244 is configured including the rotation shaft 242, a rotor core 248 fixed to the rotation shaft 242, a conductive coil, not illustrated in the drawings, coiled around the rotor core 248, and a commutator, not illustrated in the drawings, fixed to the rotation shaft 242 in order to switch the flow of current to the coil coiled around the rotor core 248. The stator 246 is configured including the motor housing 240, at an axial center portion of which the rotor 244 is disposed such that the majority of the rotor 244 is covered, and magnets 250 fixed to an inner peripheral face of the motor housing 240. The motor housing 240 includes a tube shaped portion 252 that is formed in a tube shape and to which an inner peripheral face of which the magnets 250 are fixed, and a first side wall portion 254 and a second side wall portion 256, respectively provided so as to close off one side end portion and another side end portion of the tube shaped portion 252. A first boss portion 258, serving as an engaging portion inside which a shaft bearing that supports part of the rotation shaft 242 is disposed, is provided standing out from an axial center portion of the first side wall portion 254. A second boss portion 260 inside which a shaft bearing that supports another portion of the rotation shaft 242 is disposed, is provided standing out from an axial center portion of the second side wall portion 256. Moreover, respective outer peripheral faces 258A and 260A of the first boss portion 258 and the second boss portion 260 are configured with circular cylinder face profiles disposed coaxially to the rotation shaft 242.

Figure 9:
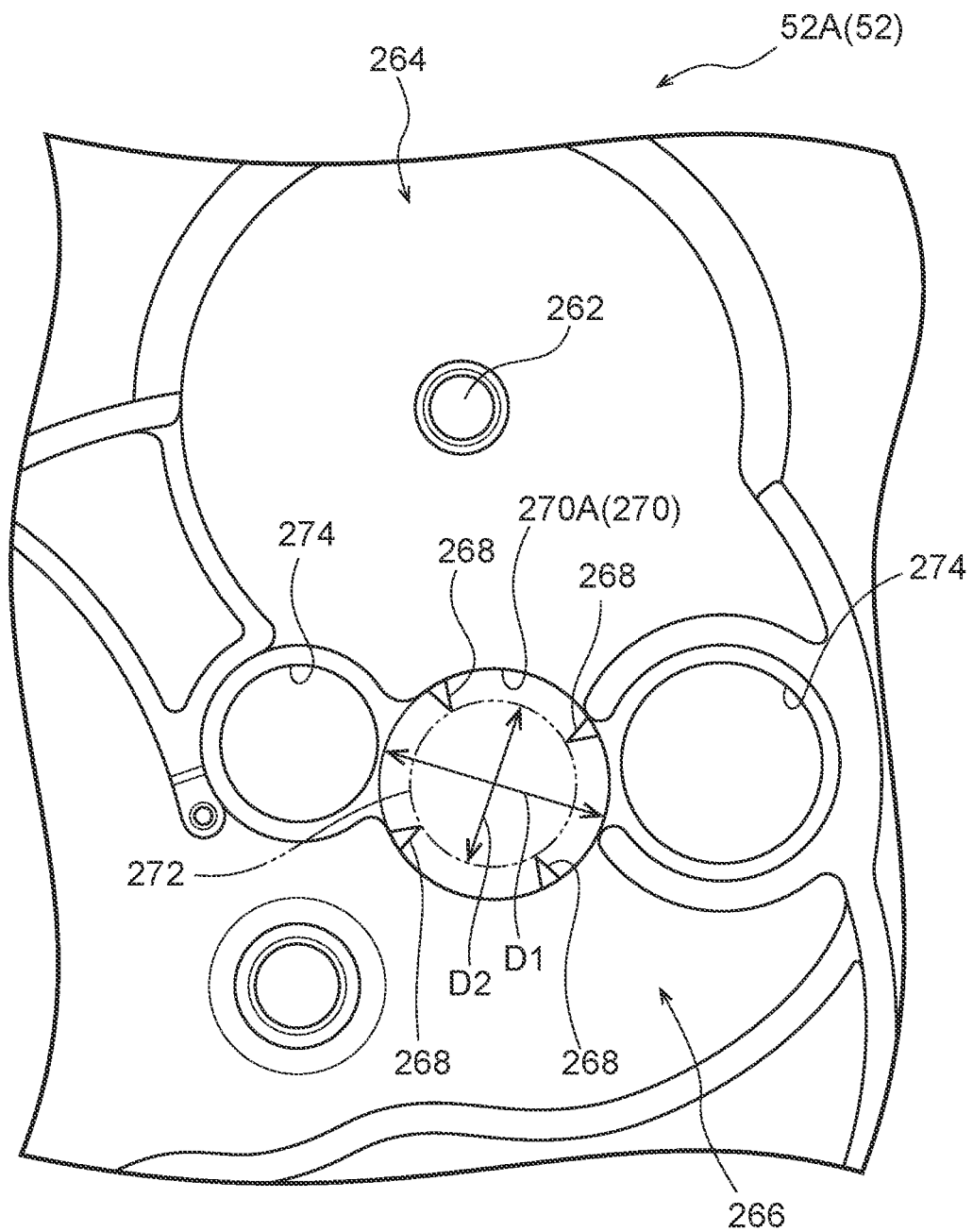
FIG. 9 is an enlarged plan view illustrating the vicinity of a motor fixing section where a motor is fixed to a gear housing.

As illustrated in FIG. 9, a B-gear support portion 264, serving as a second gear support portion, to which a shaft portion 262 that rotatably supports the B-gear is fixed, is provided inside the housing recess (concave portion) 52A of the gear housing 52. Moreover, a motor fixing section 266, to which the motor 38 (see FIG. 1 and FIG. 8) is fixed, is provided at a location adjacent to (next to) the B-gear support portion 264 inside the housing recess 52A of the gear housing 52. An engaged hole 270, serving as an engaged portion, that is provided with four projections 268 at an inner peripheral portion, is formed in the motor fixing section 266. Note that the projection direction height of the projections 268 is exaggerated in FIG. 9.

The profile of an inner peripheral face 270A of a location of the engaged hole 270 at which location the projections 268 are not formed is formed as a circular cylinder face profile having an internal diameter D1 that is larger than the external diameter of the outer peripheral face 258A of the first boss portion 258 (see FIG. 8) of the motor housing 240. Moreover, the four projections 268 are disposed at uniform intervals around the peripheral direction of the inner peripheral face 270A of the location of the engaged hole 270 at which location the projections 268 are not formed. Moreover, an imaginary circle 272 passing through projection direction leading ends of the four projections 268 has an internal diameter D2 set smaller than the external diameter of the outer peripheral face 258A of the first boss portion 258 (see FIG. 8) of the motor housing 240. Two fixing screw insertion holes 274 into which fixing screws, not illustrated in the drawings, are inserted, are formed around the vicinity of the engaged hole 270 of the motor fixing section 266.

Moreover, as illustrated in FIG. 8 and FIG. 9, by the first boss portion 258 of the motor housing 240 being inserted into the engaged hole 270 formed in the motor fixing section 266, the four projections 268 are deformed between the outer peripheral face 258A of the first boss portion 258 and the inner peripheral face 270A of the location of the engaged hole 270 at which location the projections 268 are not formed. The first boss portion 258 thus engages with the engaged hole 270 so as to have tightening margin (in other words, interference, or jamming) therebetween.

For example, the tightening margin corresponds to dimension of a difference between a radius of the imaginary circle 272 passing through projection direction leading ends of the four projections 268 before deformation (half of the internal diameter D2) and a radius of the outer peripheral face 258A of the first boss portion 258 (half of the external diameter of the outer peripheral face 258A), in other words, corresponds to deformed amount of the projection 268 in a case in which only the projections 268 are deformed.

Moreover, the fixing screws, not illustrated in the drawings, inserted into the two fixing screw insertion holes 274 formed in the motor fixing section 266 around the vicinity of the engaged hole 270 are screwed into fixing screw insertion holes 276 (see FIG. 1) formed in the first side wall portion 254 of the motor housing 240, thereby fixing the motor 38 to the motor fixing section 266 of the gear housing 52.

Operation and Advantageous Effects of the Present Exemplary Embodiment

Next, explanation follows regarding operation and advantageous effects of the present exemplary embodiment.

As illustrated in FIG. 1, in the webbing take-up device 10 configured as described above, in a stored state of the webbing taken up on the spool 20 in a layered shape, when the webbing is pulled while pulling on a tongue plate, not illustrated in the drawings, the webbing is pulled out while rotating the spool 20 in the pull-out direction, against the urging force of the retractor spring 82 that urges the spool 20 toward the take-up direction.

In a state in which the webbing has been pulled out, the webbing is worn over the body of an occupant by entraining the webbing around the front of the body of the occupant seated in a seat, inserting the tongue plate into a buckle device, and retaining the tongue plate in the buckle device.

Figure 10:
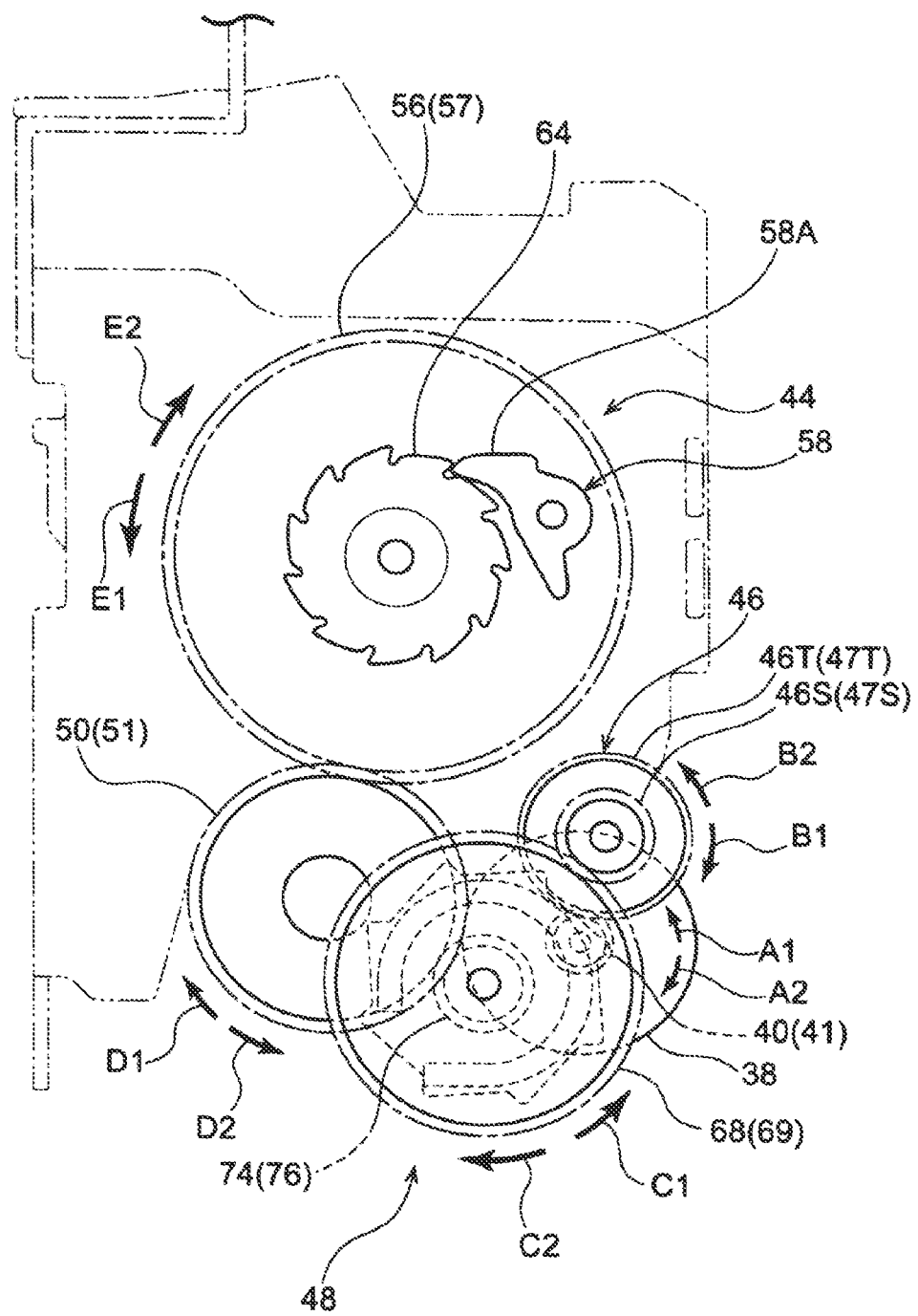
FIG. 10 is an explanatory diagram to explain a first transmission route of rotation of a rotation shaft of a motor during fitting assist and during pre-tensioning.

When insertion of the tongue plate into the buckle device has been detected by a switch or the like, not illustrated in the drawings, a motor controller, not illustrated in the drawings, rotates the rotation shaft 242 of the motor 38 in a forward direction. Rotation of the rotation shaft 242 of the motor 38 is transmitted to the spool 20 through a first transmission route, illustrated in FIG. 10. Specifically, the rotation shaft 242 of the motor 38 rotates the A-gear 40 in the arrow A1 direction. When the A-gear 40 is rotated in the arrow A1 direction, the B-gear 46 is rotated in the arrow B1 direction by the A-gear 40, and the OL-gear 48 is rotated in the arrow C1 direction by the B-gear 46. Further, the C-gear 50 is then rotated in the arrow D1 direction by the OL-gear 48, and the clutch gear 56 of the first clutch 44 is rotated in the arrow E1 direction by the C-gear 50. Note that when the clutch gear 56 is rotated in the arrow E1 direction, the lock bar 58 engages with the ratchet 64. As a result, the rotation of the clutch gear 56 is transmitted to the ratchet 64, and the spool 20 rotates in the take-up direction together with the ratchet 64. The webbing is thereby taken up onto the spool 20, removing slack in the webbing worn by the occupant (this is referred to as "fitting assist"). Then, in a state in which the rotation shaft 242 of the motor 38 has stopped rotating, the webbing restrains the occupant with a relatively weak force as a result of the urging force of the retractor spring 82.

In a state in which the vehicle is travelling, when a detection device, not illustrated in the drawings, detects a sudden deceleration of the vehicle, for example, the motor controller, not illustrated in the drawings, rotates the rotation shaft 242 of the motor 38 in the forward direction. When this is performed, the rotation force of the rotation shaft 242 of the motor 38 is set higher than the rotation force during the fitting assist mentioned above. The rotation of the rotation shaft 242 of the motor 38 in the forward direction is transmitted to the spool 20 through the first transmission route illustrated in FIG. 10, such that the webbing is taken up onto the spool 20, removing slack in the webbing worn by the occupant (this is referred to as "pre-tensioning").

On the other hand, when the occupant stops the vehicle and releases the tongue plate from the buckle device, the spool 20 rotates in the take-up direction under the urging force of the retractor spring 82. However, since the urging force of the retractor spring 82 is set so as to be comparatively weak, the spool 20 rotates in the take-up direction with a comparatively weak rotation force, commensurate with the urging force of the retractor spring 82.

At this time, the motor controller, not illustrated in the drawings, rotates the rotation shaft 242 of the motor 38 in the reverse direction. The rotation of the rotation shaft 242 of the motor 38 is transmitted to the spool 20 through a second transmission route, illustrated in FIG. 11. Note that the reduction ratio of the second transmission route is set higher than the reduction ratio of the first transmission route described above.

When the rotation shaft 242 of the motor 38 is rotated in the reverse direction, the rotation shaft 242 of the motor 38 rotates the A-gear 40 in the arrow A2 direction. When the A-gear 40 is rotated in the arrow A2 direction, the B-gear 46 is rotated in the arrow B2 direction by the A-gear 40, and the OL-gear 48 is rotated in the arrow C2 direction by the B-gear 46. Then, the input gear 200 is rotated in the arrow F1 direction by the OL-gear 48. When this occurs, as illustrated in FIG. 4 to FIG. 6, the rotation force of the input gear 200 is transmitted to the rotor plate 128 of the second clutch 116 through the sub clutch spring 202 and the rotor plate 128 is rotated in the arrow F1 direction together with the base 118.

The rotation of the base 118 is transmitted to the clutch weight 170 through the support shaft 176 and the shaft bearing hole 174, and is transmitted to the clutch weight 172 through the support shaft 178 and the shaft bearing hole 175, such that the clutch weight 170 and the clutch weight 172 rotate about the axis of the base 118 following the base 118. Accordingly, centrifugal force acts on the clutch weight 170 and the clutch weight 172. As a result, the clutch weight 170 and the clutch weight 172 rotate (tilt) toward the radial direction outside of the base 118 about the support shafts 176, 178 and against the urging force of the return spring 164 acting on the lever 148.

Accordingly, the lever 148 rotates toward the another direction about the axis (the arrow F2 direction in FIG. 7A and FIG. 7B) with respect to the base 118, with the coupling projection 158 engaged with the engagement pawl 180 of the clutch weight 170 and the coupling projection 156 engaged with the engagement pawl 182 of the clutch weight 172.

Figure 11:
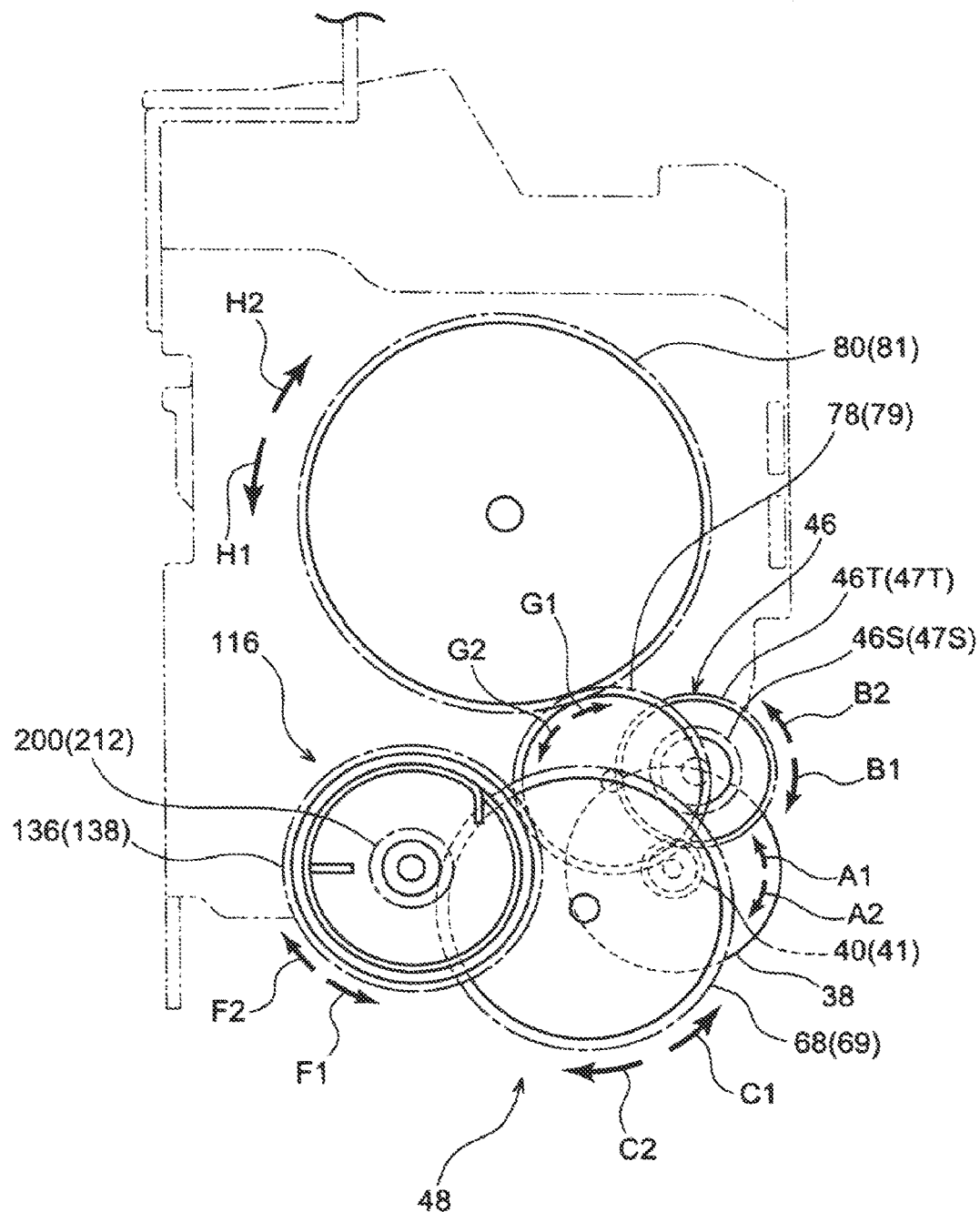
FIG. 11 is an explanatory diagram to explain a second transmission route of rotation of a rotation shaft of a motor during take-up assist.

When the lever 148 rotates about the axis toward the another direction with respect to the base 118, the second caught portion 146 of the clutch spring 140 is moved toward the one coil direction of the clutch spring 140 (the arrow F2 direction in FIG. 7A and FIG. 7B) by the lever 148. As a result, the external diameter dimension of the coil portion 141 of the clutch spring 140 is enlarged, placing the outer peripheral portion of the coil portion 141 of the clutch spring 140 in tight contact with the inner peripheral face of the clutch gear 136. Accordingly, the rotation of the clutch spring 140 is transmitted to the clutch gear 136, and the clutch gear 136 rotates toward the arrow F1 direction. As illustrated in FIG. 11, the outer teeth 138 of the clutch gear 136 are meshed together with the outer teeth 79 of the idle gear 78, such that the idle gear 78 is rotated in the arrow G1 direction. The spool gear 80 is rotated in the arrow H1 direction by the idle gear 78, rotating the spool 20 in the take-up direction together with the spool gear 80. The rotation of the spool 20 makes up the insufficiency in the urging force of the retractor spring 82 to take up and store the webbing in a layered shape on the spool 20 (this is known as "take-up assist").

Moreover, in such cases, since the spool 20 is rotated at a lower speed than during the fitting assist described above, the webbing can be taken up and stored on the spool 20 safely. Moreover, in the present exemplary embodiment, the webbing can easily be pulled out from the spool 20 even when performing the take-up assist described above. Namely, the spool 20 can easily be rotated in the pull-out direction against the torque of the take-up assist.

When the webbing has been fully taken up on the spool 20, the power supply to the motor 38 is cut off by the motor controller, stopping rotation of the rotation shaft 242 of the motor 38.

When the rotation of the motor 38 stops, the clutch weight 170 and the clutch weight 172 rotate toward the radial direction inside of the base 118 under the elastic force of the clutch spring 140 and the elastic force of the return spring 164 acting on the lever 148. The clutch spring 140 accordingly returns once more to its natural state, and the outer peripheral portion of the coil portion 141 separates from the inner peripheral face of the clutch gear 136, promptly releasing the coupling between the clutch spring 140 and the clutch gear 136 described above. The coupling together of the spool 20 and the rotation shaft 242 of the motor 38 through the second clutch 116 is thereby released, allowing the webbing taken up on the spool 20 to be pulled out again.

Note that configuration is made such that rotation of the rotation shaft 242 of the motor 38 in the reverse direction during take-up assist is not transmitted to the spool 20 through the first transmission route (through the A-gear 40, the B-gear 46, the OL-gear 48, the C-gear 50, and the first clutch 44).

As illustrated in FIG. 11, during fitting assist and during pre-tensioning, the rotation of the rotation shaft 242 of the motor 38 in the forward direction is transmitted to the input gear 200 through the A-gear 40, the B-gear 46, and the OL-gear 48, and the input gear 200 is rotated in the arrow F2 direction. When this occurs, the input gear 200 spins freely with respect to the sub clutch spring 202, such that the rotation force of the input gear 200 is not transmitted to the rotor plate 128 through the sub clutch spring 202. Namely, in the present exemplary embodiment, the second clutch 116 is capable of suppressing rotation of the second clutch 116 in cases in which there is no need to transmit the rotation force of the input gear 200 to the spool 20 through the idle gear 78 and the spool gear 80. In other words, non-essential actuation (rotation) of the second clutch 116 can be suppressed.

Next, explanation follows regarding operation and advantageous effects distinct to the webbing take-up device 10 according to the present exemplary embodiment.

As illustrated in FIG. 8 and FIG. 9, in the present exemplary embodiment, the first boss portion 258 of the motor housing 240 engages with the engaged hole 270 formed in the motor fixing section 266 such that tightening margin exists therebetween. This thereby enables variation in a separation between the rotation shaft 242 of the motor 38 and the rotation shaft (shaft portion 262) of the B-gear 46 to be suppressed. Accordingly, as illustrated in FIG. 11, the outer teeth 41 of the A-gear 40 and the outer teeth 47T of the large diameter portion 46T of the B-gear 46 mesh together stably, thereby enabling a reduction in operation noise during rotation of the spool 20 under drive force from the motor 38. Namely, operation noise during take-up assist can be reduced.

Moreover, in the present exemplary embodiment, the first boss portion 258 of the motor housing 240 is inserted into the engaged hole 270 formed in the motor fixing section 266, such that the four projections 268 are deformed between the outer peripheral face 258A of the first boss portion 258 and the inner peripheral face 270A of the engaged hole 270 at the location where the projections 268 are not formed. In this manner, in the present exemplary embodiment, providing the deformable projections 268 enables the first boss portion 258 of the motor housing 240 to easily engage with the engaged hole 270 of the motor fixing section 266 in a state in which tightening margin exists therebetween.

Figure 12:
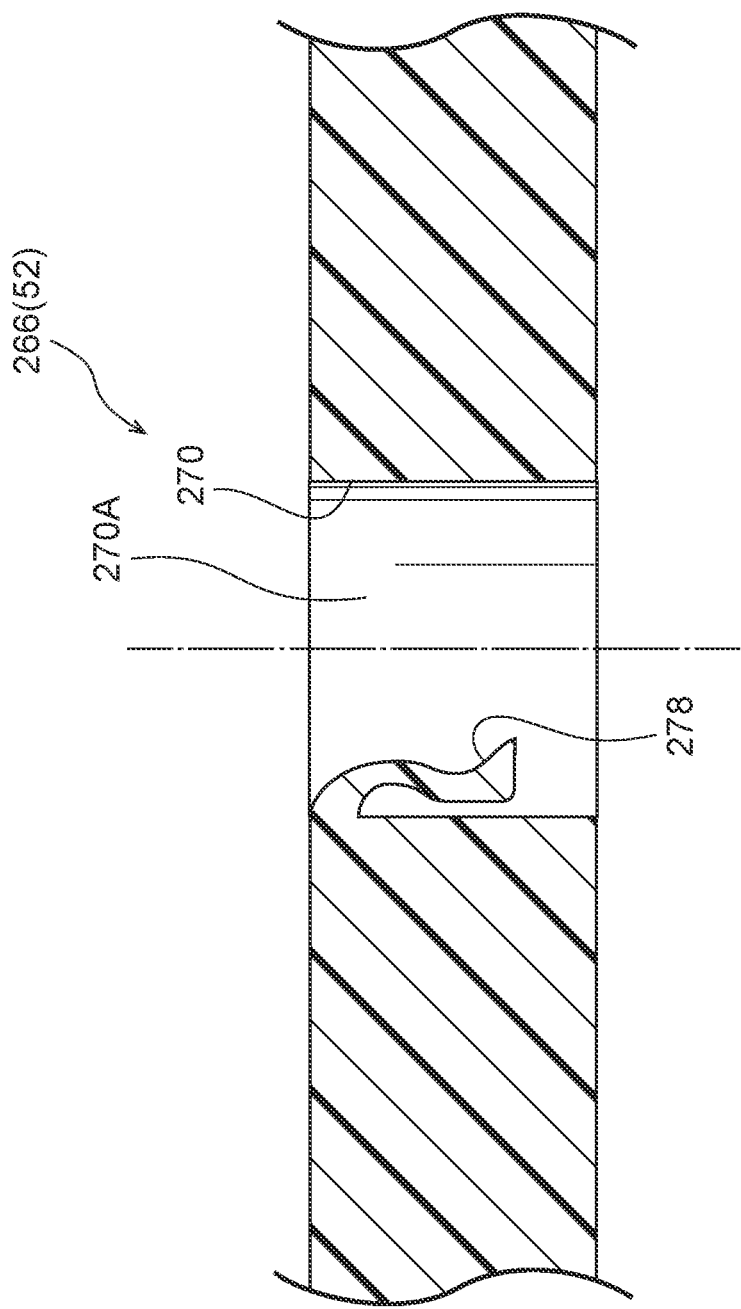
FIG. 12 is a cross-section illustrating an engaged hole provided with a flexible tab.

Note that in the present exemplary embodiment, explanation has been given regarding an example in which the first boss portion 258 of the motor housing 240 is engaged with the engaged hole 270 formed in the motor fixing section 266 such that tightening margin exists therebetween as a result of the projections 268 being deformed between the outer peripheral face 258A of the first boss portion 258 and the inner peripheral face 270A of the engaged hole 270 at the location where the projections 268 are not formed. However, the present exemplary embodiment is not limited thereto. For example, the profile of the inner peripheral face 270A of the engaged hole 270 formed in the motor fixing section 266 may be formed with a profile corresponding to the profile of the outer peripheral face 258A of the first boss portion 258 of the motor housing 240, and the first boss portion 258 of the motor housing 240 may be gently pressed and fitted into the engaged hole 270 in the motor fixing section 266 such that the first boss portion 258 of the motor housing 240 engages with the engaged hole 270 of the motor fixing section 266 in a state in which tightening margin exists therebetween. Moreover, as illustrated in FIG. 12, a flexible tab(s) 278, capable of undergoing flexing deformation toward a radial direction outside of the inner peripheral face 270A of the engaged hole 270, may be provided at an inner peripheral portion of the engaged hole 270. In such a configuration, when the first boss portion 258 of the motor housing 240 is inserted into the engaged hole 270 of the motor fixing section 266, the flexible tab 278 flexes, and the flexible tab 278 is deformed between the outer peripheral face 258A of the first boss portion 258 and the inner peripheral face 270A of the engaged hole 270. The first boss portion 258 of the motor housing 240 thus engages with the engaged hole 270 formed in the motor fixing section 266 such that tightening margin exists therebetween.

Moreover, in the present exemplary embodiment, explanation has been given regarding an example in which plural of the projections 268 are disposed at uniform intervals around the peripheral direction of the inner peripheral face 270A of the engaged hole 270 at the location where the projections 268 are not formed (namely, the outer peripheral face 258A of the first boss portion 258 and only the deformed portions of the projections 268 are abutted, that is, the portion of the inner peripheral face 270A of the engaged hole 270 at the location where the projections 268 are not formed and the outer peripheral face 258A of the first boss portion 258 are not abutted). However, the present exemplary embodiment is not limited thereto. For example, as illustrated in FIG. 13 and FIG. 14, plural of the projections 268 may be disposed clustered (concentratively) around one part of the inner peripheral face 270A of the engaged hole 270.

As illustrated in FIG. 13, plural (three) of the projections 268 are disposed clustered on one part of the inner peripheral face 270A of the engaged hole 270, which one part is on the side of the engaged hole 270 that is at an axial center 280 side of the shaft portion 262, at a portion intersected by a line L, where the line L passes through the axial center 280 of the shaft portion 262 (see FIG. 9) supporting the B-gear 46, and passes through a center point 282 of the inner peripheral face 270A at a location of the engaged hole 270 where the projections 268 are not formed. Moreover, FIG. 14 illustrates plural (three) of the projections 268 disposed clustered on one part of the inner peripheral face 270A of the engaged hole 270, which one part is at the opposite side of the engaged hole 270 to the axial center 280 side of the shaft portion 262, at a portion intersected by the line L. The configurations illustrated in FIG. 13 and FIG. 14 enable the first boss portion 258 of the motor housing 240 inserted into the engaged hole 270 to be made to abut a portion 284 that is a portion of the inner peripheral face 270A of the engaged hole 270 where the projections 268 are not formed, and that is intersected by the line L. This thereby enables a separation between the axial center 280 of the shaft portion 262 supporting the B-gear 46 and an axial center 286 of the rotation shaft 242 of the motor 38 to be made even more stable.

Explanation has been given regarding one exemplary embodiment. However, it is not limited to the above, and obviously various other modifications to the above may be implemented.

What is claimed is:

1. A webbing take-up device comprising:
   a spool on which a webbing worn by an occupant is taken up;
   a motor that includes a rotation shaft and an engaging portion disposed coaxially with the rotation shaft;
   a first gear that is fixed to the rotation shaft;
   a second gear that meshes with the first gear and that is rotated due to the first gear being rotated such that the spool is rotated; and
   a housing that includes a second gear support portion on which the second gear is supported, and
   an engaged portion that is engaged with the engaging portion such that a tightening margin exists between the engaged portion and the engaging portion, the motor being fixed to the housing in a state in which the engaging portion is engaged with the engaged portion,
   wherein the engaged portion is an engaged hole, a projection being provided at an inner peripheral portion of the engaged hole; and the projection is deformed in a state in which the engaging portion is disposed inside the engaged hole.

2. The webbing take-up device of claim 1, wherein the engaging portion abuts a portion of an inner peripheral face of the engaged hole, the projection not being formed at the portion of the inner peripheral face.

3. The webbing take-up device of claim 1, wherein the engaging portion abuts only a deformed portion of the projection.

* * * * *